May 30, 1933.　　　J. S. BROWN　　　1,912,125
DISK HARROW
Filed Oct. 12, 1929　　　5 Sheets-Sheet 5

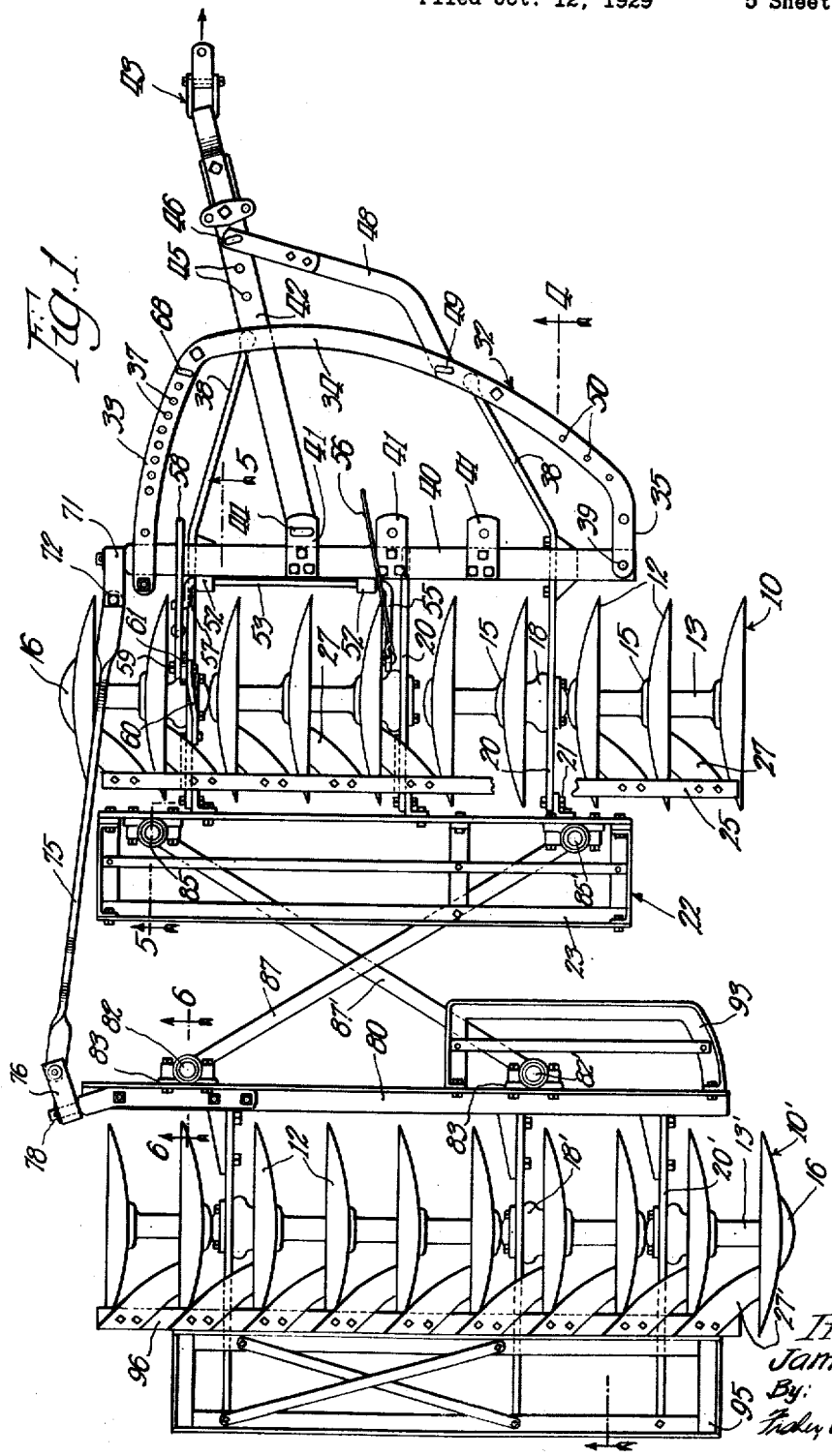

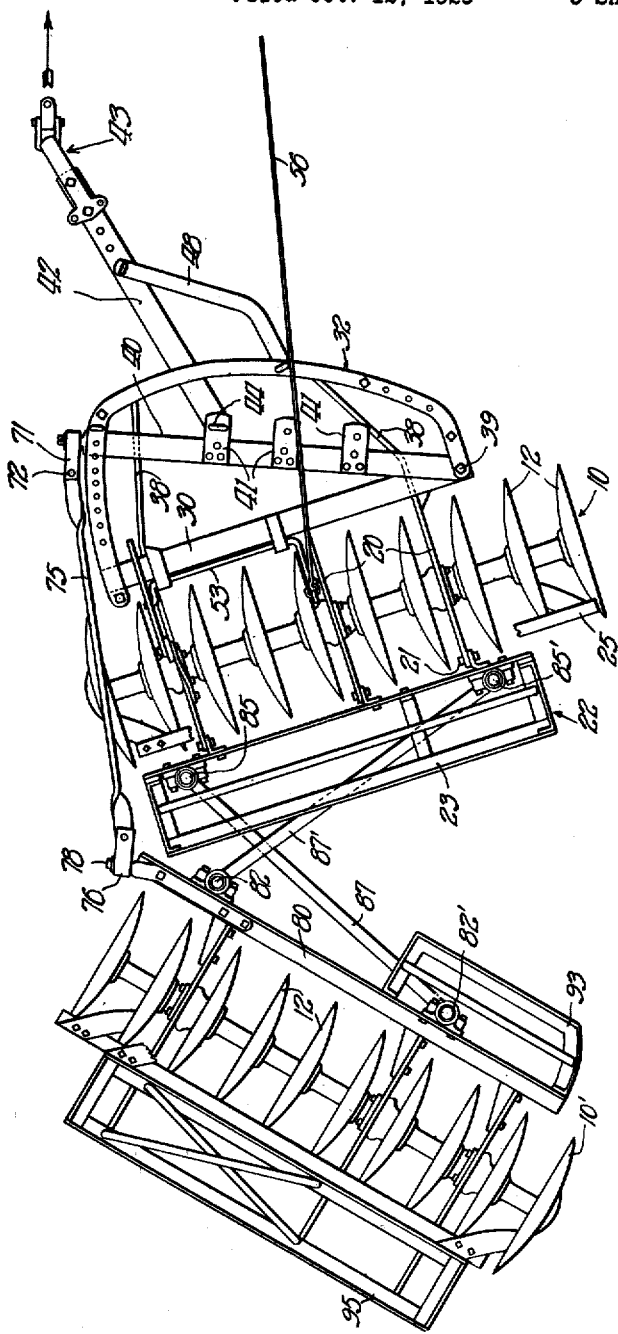

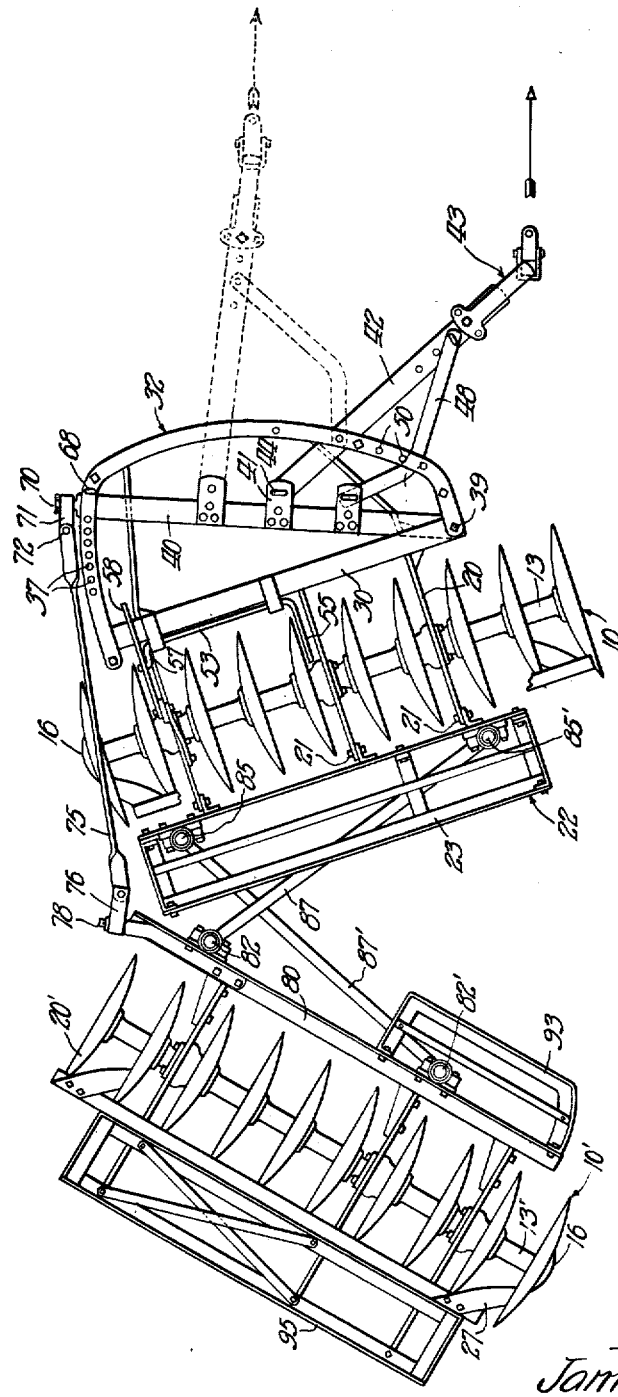

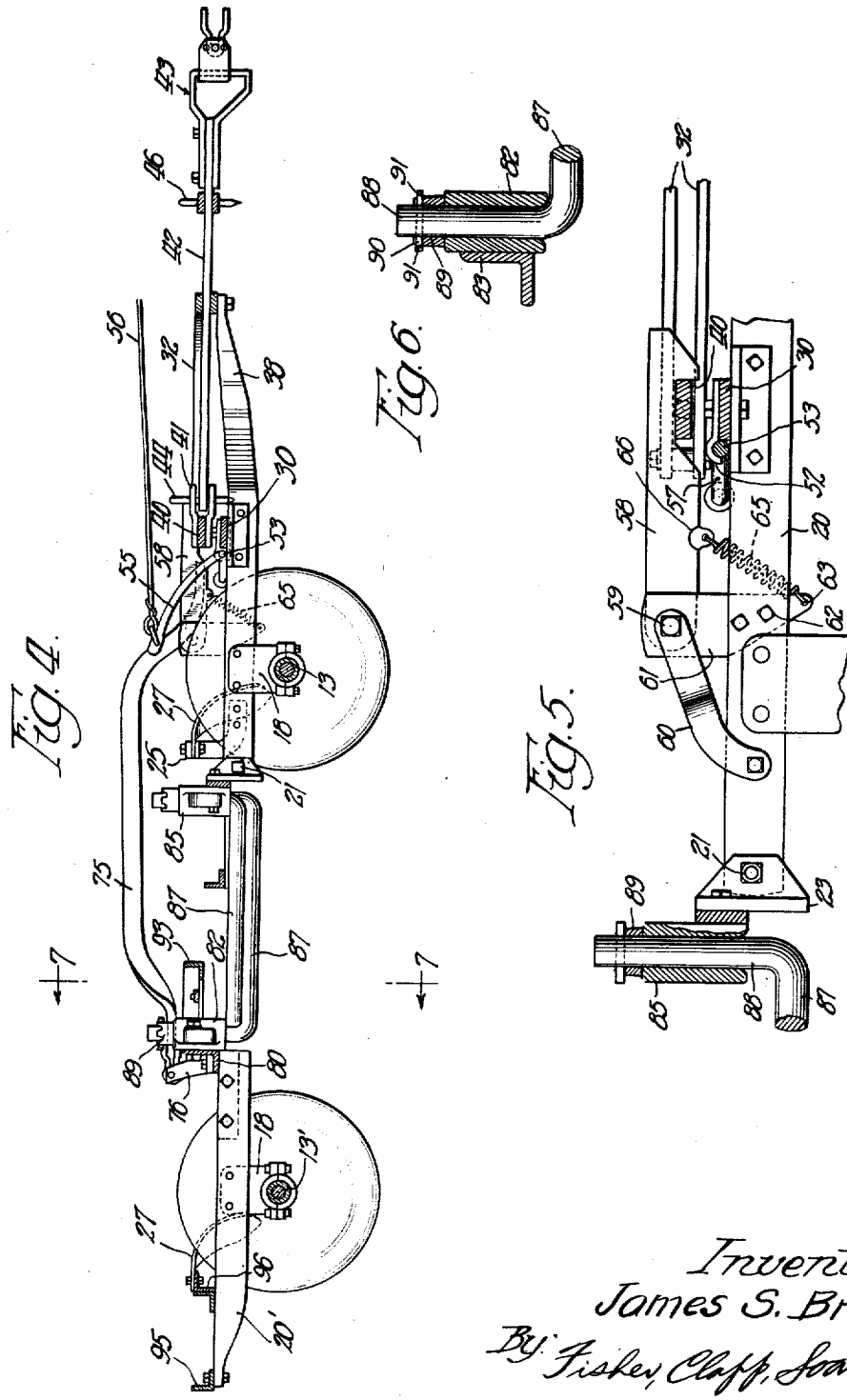

Inventor
James S. Brown
By Fisher, Clapp, Soans & Pond
Attys.

Patented May 30, 1933

1,912,125

UNITED STATES PATENT OFFICE

JAMES S. BROWN, OF FRESNO, CALIFORNIA, ASSIGNOR TO J. I. CASE COMPANY, OF RACINE, WISCONSIN, A CORPORATION OF WISCONSIN

DISK HARROW

Application filed October 12, 1929. Serial No. 399,124.

My invention relates broadly to agricultural implements and has to do more particularly with disk harrows and especially to offset disk harrows of the tandem-gang type.

A particular object of my invention is to provide a disk harrow of the type referred to which may be offset from the line of pull of the tractor which is moving the harrow, so that the implement may be operated close to trees or other obstructions without interfering with low lying branches, etc.

Another object is to provide a device of the class referred to, which will be adapted to follow the surface contour of the ground over which it moves without undue penetration at any restricted points.

A further object is to provide a device of the class referred to which will be adjustable for offsetting at various degrees to the right or left of the tractor and will also be adjustable for varying the degree of penetration into the soil and for harrowing most effectively various types of soil.

Still another object is to provide such a device which will be simple in construction, comprising a small number of relatively simple and inexpensive parts, efficient in operation, widely adjustable, and rugged.

Various other objects and advantages will be readily apparent to those skilled in the art, from the description herein given.

Referring now to the drawings forming a part of this specification:—

Fig. 1 is a top plan view of a device embodying my invention, representing it in inoperative condition,—that is, in a condition wherein the device may be transported over the ground without any harrowing effect;

Fig. 2 is a similar view of the device so adjusted as to be offset to the right of the tractor, looking in the direction of movement of the tractor;

Fig. 3 is a similar view of the same device so adjusted as to be offset to the left of the tractor, and with parts shown in dotted position, whereby the device is adjusted for center pull,—that is, wherein the device harrows directly behind a tractor with no offset;

Fig. 4 is a sectional view taken substantially on the line 4—4 of Fig. 1;

Figs. 5 and 6 are fragmentary detailed elevational views, on an enlarged scale, of certain features of the invention, parts being shown in section;

Figure 7:
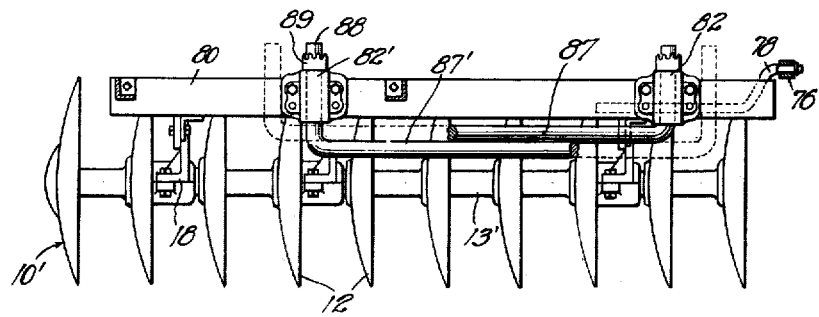
Fig. 7 is a sectional view taken substantially on the line 7—7 of Fig. 4.

The preferred embodiment of my invention illustrated in the drawings, comprises two gangs 10 and 10' of disks 12. These disks are preferably curved so as to represent a spherical or similar section and are mounted on axles 13 and 13', the disks of the respective gangs being oppositely arranged as to curvature. Formed on the axles are bosses 15 which co-operate in pairs so as to engage the disks upon opposite sides thereof for securely seating them. The disks of each gang are secured at one end of the axle by means of a spherical cap 16 and at the other end by means of a nut (not shown) threaded on the ends of the respective axles.

Secured on each of the axles 13 and 13' is a plurality of brackets 18 and 18', respectively, and attached to each of these brackets, by means of bolts or other suitable means, are arms 20 and 20', respectively.

Figure 8:
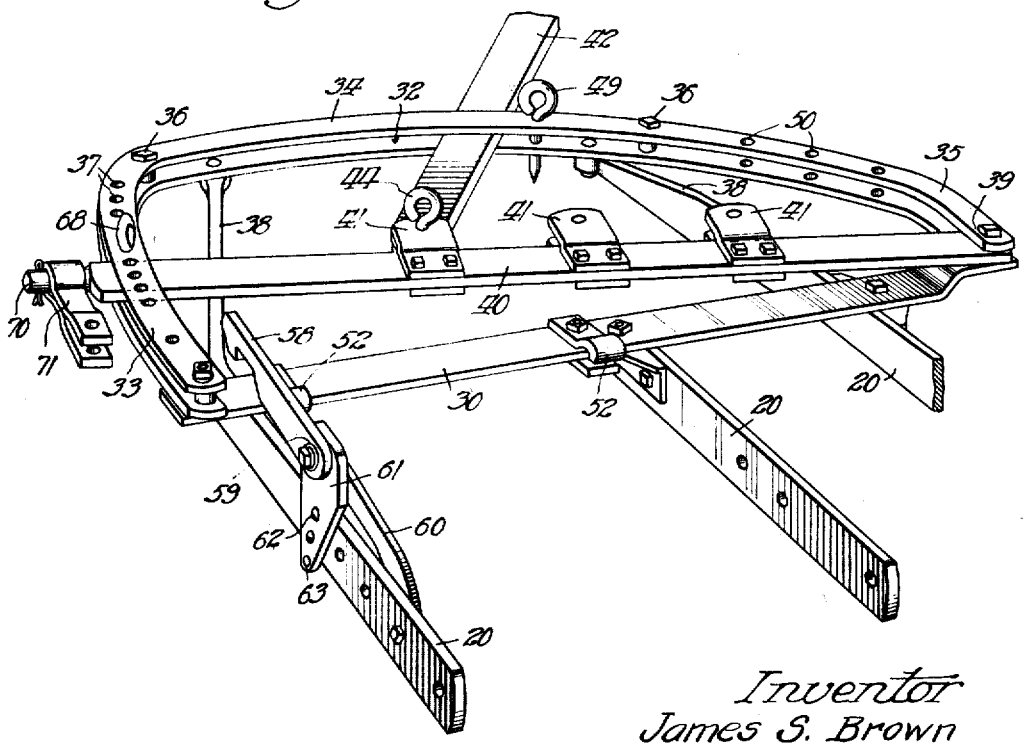
Fig. 8 is a perspective view, on an enlarged scale, of controlling portions of the mechanism.

Referring now to the forward gang 10, it will be seen that the arms 20 have pivotally secured to the rear ends thereof, as at 21, a rectangular frame 22, comprising a plurality of metal strips or bars 23, which may be angle irons or the like, bolted together or secured by other suitable means. Also secured to the bars 20 is a transverse strip 25 which has secured thereto a plurality of suitable scraper members 27 which are adapted to function automatically to remove dirt from the disks as the device moves over the ground. Attached to the forward ends of the bars 20 is a transverse bar 30 (Fig. 8), to which is attached a pair of guide bars 32. The bars 32 are similar and extend in a normally horizontal plane in substantially parallel alignment with each other and are eccentrically arcuate, extending longitudinally or forwardly to form a portion 33 of substantially uniform curvature, and then transversely of the device to form a portion 34 of substantially uniform curvature, and then longitudinally or rearwardly to form a substantially straight portion 35. The bars 32 have a plurality of aligned apertures 37 at various points, which are designed for a purpose which will hereafter become apparent. Two or more of the bars 20 preferably extend forwardly, as shown at 38, to support the bars 32, and shouldered bolts 36 or the like are provided for retaining the bars 32 in spaced relation.

Pivotally secured to the bar 30 at one extremity thereof, as at 39, and disposed between the bars 32, is a transverse bar 40. Secured intermediate of the extremity of the bar 40 is a plurality of brackets 41 which comprise a pair of vertically aligned plates. Engageable with one of the brackets 41 is a connecting bar 42 which carries a suitable coupling member, indicated generally at 43, at the free extremity thereof, for attachment to a tractor or the like. The connecting bar 42 is disposed between the plates of the particular bracket 41 to which it is secured and is maintained in engagement therewith by means of a pin 44, or the like, extending through aligned apertures in the bracket 40 and in the bar 42. The connecting bar 42 is apertured at various points along its length as at 45 (Fig. 1), and engageable in one of these apertures is a pin 46 or the like, which secures to the bar 42 a lock bar 48. This bar at its other extremity is connected to the bars 32 by means of a pin 49 passing through a pair of aligned apertures 50 in the parallel bars 32 and the lock bar 48.

Secured to the bar 30 by means of clamps 52 or other suitable means is a rod 53 terminating at one extremity adjacent the midpoint of the bar 30 in a crank arm 55, having an eye adjacent the end thereof, whereby a cable 56 may be secured for manipulation by an operator seated on a tractor (Fig. 4). The rod 53 has an offset crank portion 57 adjacent the other extremity thereof, which is engageable with a pawl 58. This pawl is pivotally secured as at 59 to a bracket 61 (Fig. 5), which is mounted on one of the bars 20 by means of bolts, rivets or the like, 62. A reinforcing arm 60 extends between the bracket 61 and its supporting arm 20. The bracket 61 is apertured at one end thereof as at 63 and a helical tension spring 65 extends between this aperture and an apertured lug 66 formed on the pawl 58, whereby the pawl is normally maintained in engagement with the bar 40 for retaining this bar in a position whereby the gangs are parallel and the machine is inoperative, as shown in Fig. 1.

It will be readily apparent that a pull on the cable 56 will result in rocking the rod 53 about its longitudinal axis whereby the crank 57 will urge the pawl out of engagement with the bar 40 and thus enable the bar 40 to be moved outwardly to a position as shown in Fig. 3, whereby the device will be in operative condition. A pin 68 may be inserted in any desired pair of the apertures 37 for limiting the outward movement of the bar 40.

The bar 40 terminates at one of its ends in a cylindrical bearing member 70 on which is loosely mounted a sleeve 71. Pivotally secured to this sleeve, as at 72, is a link 75 which is pivotally connected at its opposite end to a similar sleeve 76, which is engageable with a pintle 78 formed on one end of a bar 80 which is carried by the axle 13' by means of the bars 20'.

Secured to the bar 80 is a pair of bearing members 82 and 82'. Each of these bearing members is preferably cast integral with a plate 83 which may be secured to the bar 80 by means of bolts or the like. Similar bearing members 85 and 85' are secured to one of the members 23 forming the rack 22. Extending between the bearing members 82 and 85' is a cross bar 87, and extending between the bearing members 82' and 85 is a similar cross bar 87'. Each of these cross bars, as shown best in Fig. 6, terminates in an upturned pintle 88 which is rotatably mounted in one of the bearing members and is secured therein by means of a cap 89 which is slotted in the upper portion thereof in a manner similar to a castellated nut. A pin 90 extends through a suitable aperture adjacent the extremity of the upturned portion 88 of each of the cross bars and through a pair of opposite slots in the cap 89 and is retained by means of cotter pins 91 or the like.

Secured to the bar 80 by bolts or other suitable means is a rack 93 formed preferably of metallic strips and a similar rack 95 is secured to a transverse bar 96 mounted on the bars 20'. Suitable scrapers 27' are also mounted on the bar 96 for scraping the disks of the gang 10'.

In the operation of the device, the gangs are normally in parallel arrangement as shown in Fig. 1 when it is desired to transport the device from one place to another without any harrowing action. In such a condition, the pawl 58 engages the bar 40 and thus prevents the two gangs from moving out of parallel alignment. When it is desired to operate the device for harrowing purposes, the operator from his position on the tractor pulls the cord 56 and thus trips the pawl 58, permitting the bar 40 to be moved forwardly about its pivot 39 as the tractor continues its forward movement, and thus effecting angular movement between the two gangs.

Prior to the operation of the device, there will preferably have been seated on the racks 23, 93 and 95 suitable weights which may be in the form of any heavy objects. The racks are so designed that any convenient containers may be mounted thereon and any objects, such as odd pieces of metal or the like, may be disposed in such containers so as to provide the desired weight. The provision of such weights has the effect of equalizing the pressure of the gangs throughout their entire extent so that all the disks will tend to penetrate substantially equally into the soil.

It should furthermore be noted that, prior to the release of the pawl, the bars 42 and 48 will have been properly arranged so that the harrow, when in operative condition, will be offset either to the right or left of the tractor and to the desired extent. Thus when it is desired that the offset shall be to the left of the tractor, the bar 42 will be secured to the center bracket 41, while the lock bar 48 will be attached to the right bracket 41, as shown in full lines in Fig. 3. When, however, it is desired that the offset shall be to the right of the tractor, the bar 42 will be secured to the left bracket 41 and the lock bar will be connected at its extremity to a pair of the apertures of the plates 32 opposite the center of the bar 40, as shown in Fig. 2. On the other hand, if it is desired to harrow directly behind the tractor, the bar 42 is connected to the left bracket 41, while the lock bar is connected to a pair of apertures on the plates 32 to the right of the center, as shown dotted in Fig. 3. Furthermore, it will be understood that the pin 68 will be disposed in a pair of the apertures 37 according to the amount of offset desired. The same may be said with respect to the disposition of the pin 49 in the apertures 50.

The cross bars 87, in addition to pivoting the two gangs with respect to each other, serve to prevent diagonally opposite disks from digging unequally into the soil and thus maintain the device in substantially perfect alignment with the surface. It should furthermore be noted that the device is capable of accommodating itself to any inequalities of the surface by reason of the hinged connection at 21 between the front and rear gangs. Hence, regardless of any humps, depressions or other irregularities in the surface, substantially all of the disks will be in effective engagement with the surface at all times.

The device embodying my invention as described above has the following advantages: Great adjustability which may be accomplished in a minimum of time and with slight effort. The cross bars connecting the gangs require the harrow to cut level and will accomplish this function even without the use of weights on the racks. These cross bars, furthermore, cause the harrow to cut out centers evenly and consistently, which is not accomplished by other offset harrows. Applicant's harrow, furthermore, is considerably shorter than other similar devices and this is a great advantage in orchards, where the device is particularly designed to be used. The harrow, furthermore, is much lower than other similar devices and thus has a greater clearance of low hanging branches of trees.

It is also noteworthy that the disks of the device are interchangeable. This is a real advantage where it is desired to use various sizes of disks or to replace mutilated disks. The frame, being of light construction, can be raised conveniently for clearance of obstructions.

I claim as my invention:

1. In a device of the class described, a pair of tandem disk harrow gangs, means connecting said gangs together comprising a pair of cross bars, and means connecting said cross bars to one of said gangs whereby said gangs may move vertically relative to each other.

2. In a device of the class described, a pair of tandem disk harrow gangs, means pivotally connecting said gangs together and permitting said gangs to occupy a variety of angular positions relative to each other in a horizontal plane, a guide member connected to the forward one of said gangs and extending forwardly and transversely thereof, a member adjustable on said guide member, pivoted adjacent one end of the latter, and connected to the rear gang for controlling the angular adjustment of said gangs, a hitching member pivotally secured to said pivoted member, and means for adjustably attaching said hitching member to said guide member for fixing and maintaining said gangs in a predetermined position relative to a tractor drawing said device.

3. In a device of the class described, a pair of tandem disk harrow gangs, means pivotally connecting said gangs together comprising a pair of cross bars, a guide member fixedly connected to one of said gangs, means movable relative to said guide member and connected to the other of said gangs, means on said guide member whereby said last-named means may be fixed in a plurality of adjusted positions for maintaining said gangs in a predetermined position relative to each other, a draft member secured to said movable means, means connecting said guide member to said draft member for locking the latter in fixed relation to said movable means, and means whereby said draft member may be attached to said movable means at a plurality of points on the latter for varying the offset of said device relative to said tractor.

4. In a device of the class described, a pair of tandem disk harrow gangs, means pivotally connecting said gangs together permitting said gangs to occupy a variety of angular positions relative to each other in a horizontal plane, a guide member connected to one of said gangs and extending arcuately across and outwardly from said gang, a bar pivotally connected adjacent one end of said guide member and connected to the other of said gangs, and means for adjustably securing said bar at a plurality of points on said guide member for varying the angular relation of said gangs.

5. In a device of the class described, a pair of tandem disk harrow gangs, means connecting said gangs together comprising a pair of cross bars and means pivotally connecting said cross bars to one of said gangs whereby said gangs may move vertically relative to each other.

6. In a device of the class described, a pair of tandem disk harrow gangs, means pivotally connecting said gangs together and permitting them to occupy a variety of angular positions relative to each other in a horizontal plane, a guide member secured to one of said gangs, a transverse member pivoted to said guide member, a link pivoted to said transverse member and to the other of said gangs, releasable means normally retaining said transverse member in such position that said gangs are in parallel relation, and adjustable means operable when said releasable means is released for limiting the movement of said transverse member and thus controlling the angular relation between said gangs to a predetermined value.

7. In a device of the class described, a pair of tandem disk harrow gangs, means pivotally connecting said gangs together and permitting them to occupy a variety of angular positions relative to each other in a horizontal plane, a guide member secured to one of said gangs, a transverse member pivoted to said guide member, a link pivoted to said transverse member and to the other of said gangs, releasable means normally retaining said transverse member in such position that said gangs are in parallel relation, adjustable means operable when said releasable means is released for limiting the movement of said transverse member and thus controlling the angular relation between said gangs to a predetermined value, a hitching member, a member for locking said hitching member, and means for securing said hitching member and said locking member at a plurality of points on said transverse member whereby said device may be arranged in predetermined relation to a tractor drawing said device.

8. In a device of the class described, a pair of tandem disk harrow gangs, means pivotally connecting said gangs together and permitting them to occupy a variety of angular positions relative to each other in a horizontal plane, a guide member secured to one of said gangs, a transverse member pivoted to said guide member, a link pivoted to said transverse member and to the other of said gangs, releasable means normally retaining said transverse member in such position that said gangs are in parallel relation, adjustable means operable when said releasable means is released for limiting the movement of said transverse member and thus controlling the angular relation between said gangs to a predetermined value, a hitching member, a member for locking said hitching member, means for securing said hitching member and said locking member at a plurality of points on said transverse member whereby said device may be arranged in predetermined relation to a tractor drawing said device, and means whereby said locking member may also be secured at a plurality of points on said guide member.

9. In a device of the class described, a pair of tandem disk harrow gangs, means pivotally connecting said gangs together and permitting them to occupy a variety of angular positions relative to each other in a horizontal plane, said pivotal means comprising a pair of cross bars, a guide member secured to one of said gangs, a transverse member pivoted to said guide member, a connecting rod pivoted to said transverse member and to the other of said gangs, releasable means normally retaining said transverse member in such position that said gangs are in parallel relation, and adjustable means operable when said releasable means is released for limiting the movement of said transverse member and thus controlling the angular relation between said gangs to a predetermined value.

10. In a device of the class described, a pair of tandem disk harrow gangs, means pivotally connecting said gangs together and permitting them to occupy a variety of angular positions relative to each other in a horizontal plane, said pivotal means comprising a pair of cross bars, a guide member secured to one of said gangs, a transverse member pivoted to said guide member, a connecting rod pivoted to said transverse member and to the other of said gangs, releasable means normally retaining said transverse member in such position that said gangs are in parallel relation, adjustable means operable when said releasable means is released for limiting the movement of said transverse member and thus controlling the angular relation between said gangs to a predetermined value, a hitching member, a member for locking said hitching member, and means for securing said hitching member and said locking member at a plurality of points on said transverse member whereby said device may be arranged in predetermined relation to a tractor drawing said device.

11. In a device of the class described, a pair of tandem disk harrow gangs, means pivotally connecting said gangs together and permitting them to occupy a variety of angular positions relative to each other in a horizontal plane, said pivotal means comprising a pair of cross bars, a guide member secured to one of said gangs, a transverse member pivoted to said guide member, a connecting rod pivoted to said transverse member and to the other of said gangs, releasable means normally retaining said transverse member in such position that said gangs are in parallel relation, adjustable means operable when said releasable means is released for limiting the movement of said transverse member and thus controlling the angular relation between said gangs to a predetermined value, a hitching member, a member for locking said hitching member, means for securing said hitching member and said locking member at a plurality of points on said transverse member whereby said device may be arranged in predetermined relation to a tractor drawing said device, and means whereby said locking member may also be secured at a plurality of points on said guide member.

12. In a device of the class described, a pair of tandem disk harrow gangs, means pivotally connecting said gangs together and permitting said gangs to occupy a variety of angular positions relative to each other in a horizontal plane, a guide member fixedly connected to one of said gangs, a transverse member pivoted to the same one of said gangs and connected to the other of said gangs, means on said guide member for limiting the displacement of said transverse member whereby the angular adjustment of said gangs may be limited to a predetermined value, releasable means for locking said transverse member in a position retaining the gangs in parallel relation, a hitching member connected to said transverse member, and means for locking said hitching member in various positions relative to said transverse member for varying the degree and direction of offset of said gangs relative to a tractor.

13. In a device of the class described, a pair of tandem disk harrow gangs, means pivotally connecting said gangs together and permitting said gangs to occupy a variety of angular positions relative to each other in a horizontal plane, a guide member fixedly connected to one of said gangs, a transverse member pivoted to the same one of said gangs and connected to the other of said gangs, means on said guide member for limiting the displacement of said transverse member whereby the angular adjustment of said gangs may be limited to a predetermined value, releasable means for locking said transverse member in a position retaining the gangs in parallel relation, a hitching member connected to said transverse member, means for locking said hitching member in various positions relative to said transverse member for varying the degree and direction of offset of said gangs relative to a tractor, said hitching member being attachable to said transverse member at a plurality of points along the length thereof, and a rigid member connecting said hitching member to said guide member for locking said hitching member in various positions.

14. In a device of the class described, a pair of tandem disk harrow gangs, means pivotally connecting said gangs together, means for controlling the angular relation of said gangs, comprising a transverse bar pivoted at one end to the forward gang and a link connecting the other end of said transverse bar to the rear gang, a guide member fixed to said forward gang for controlling the angular displacement of said transverse bar and comprising a pair of substantially parallel horizontal bars extending forwardly and transversely of said forward gang, said transverse bar being slidable between the bars comprising said guide member, means adjustable at a plurality of points on said guide member for limiting the pivotal movement of said transverse bar, and releasable means normally retaining said gangs in parallel relation.

15. A device as defined in claim 2, wherein said gangs are connected to each other by means of a pair of cross bars and including means connecting said cross bars to one of said gangs, whereby said gangs may move vertically relative to each other.

16. A device as defined in claim 12, wherein said gangs are connected to each other by means of a pair of cross bars and including means connecting said cross bars to one of said gangs, whereby said gangs may move vertically relative to each other.

17. A device as defined in claim 13, wherein said gangs are connected to each other by means of a pair of cross bars and including means connecting said cross bars to one of said gangs, whereby said gangs may move vertically relative to each other.

18. In a device of the class described, a pair of tandem disk harrow gangs, means pivotally connecting said gangs together and permitting said gangs to occupy a variety of angular positions relative to each other in a horizontal plane, means pivoted relative to the forward gang and connected to the rear gang for angling said gangs relative to each other, means fixed relative to the forward gang and co-operating with said angling means for limiting the amount of angling, a hitching member pivoted to said angling means, and means for securing said hitching member at various angles relative to said angling means whereby the position of offset of said gangs relative to a tractor may be adjusted.

19. A device as defined in claim 18, wherein said gangs are pivotally connected by means of a pair of cross bars and having means connecting one of said gangs to said bars for permitting relative vertical movement between said gangs.

20. A device as defined in claim 14, wherein the means for retaining the gangs in parallel relation comprises a pawl normally urged by gravity into locking engagement with said transverse bar, and crank means for lifting said pawl out of engagement with said bar.

21. A device as defined in claim 4, wherein said guide member is fixed to and extends forwardly and transversely of the forward gang and said locking means is a rigid member attached at one end to said hitching member and at its other end attachable alternatively to said transverse member or to said guide member.

JAMES S. BROWN.

CERTIFICATE OF CORRECTION.

Patent No. 1,912,125.                                                                 May 30, 1933.

JAMES S. BROWN.

It is hereby certified that error appears in the printed specification of the above numbered patent requiring correction as follows: Page 4, line 128, strike out the claim number and words "11. In a device of the class described, a pair" and insert the same to follow line 130, lines 129 and 130, being the last two lines of claim 10; and that the said Letters Patent should be read with this correction therein that the same may conform to the record of the case in the Patent Office.

Signed and sealed this 8th day of August, A. D. 1933.

(Seal)
M. J. Moore.
Acting Commissioner of Patents.

means of a pair of cross bars and having means connecting one of said gangs to said bars for permitting relative vertical movement between said gangs.

20. A device as defined in claim 14, wherein the means for retaining the gangs in parallel relation comprises a pawl normally urged by gravity into locking engagement with said transverse bar, and crank means for lifting said pawl out of engagement with said bar.

21. A device as defined in claim 4, wherein said guide member is fixed to and extends forwardly and transversely of the forward gang and said locking means is a rigid member attached at one end to said hitching member and at its other end attachable alternatively to said transverse member or to said guide member.

JAMES S. BROWN.

CERTIFICATE OF CORRECTION.

Patent No. 1,912,125.  May 30, 1933.

JAMES S. BROWN.

It is hereby certified that error appears in the printed specification of the above numbered patent requiring correction as follows: Page 4, line 128, strike out the claim number and words "11. In a device of the class described, a pair" and insert the same to follow line 130, lines 129 and 130, being the last two lines of claim 10; and that the said Letters Patent should be read with this correction therein that the same may conform to the record of the case in the Patent Office.

Signed and sealed this 8th day of August, A. D. 1933.

(Seal)

M. J. Moore.
Acting Commissioner of Patents.

CERTIFICATE OF CORRECTION.

Patent No. 1,912,125.  May 30, 1933.

JAMES S. BROWN.

It is hereby certified that error appears in the printed specification of the above numbered patent requiring correction as follows: Page 4, line 128, strike out the claim number and words "11. In a device of the class described, a pair" and insert the same to follow line 130, lines 129 and 130, being the last two lines of claim 10; and that the said Letters Patent should be read with this correction therein that the same may conform to the record of the case in the Patent Office.

Signed and sealed this 8th day of August, A. D. 1933.

M. J. Moore.
Acting Commissioner of Patents.

(Seal)